Dec. 30, 1941.  E. C. LUNDEBERG  2,268,293
BORING MACHINE
Filed March 29, 1939
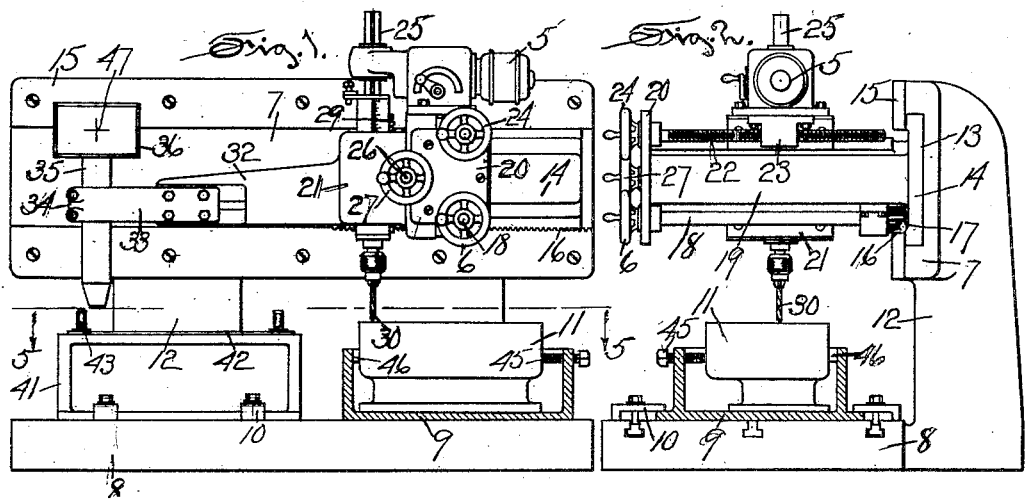
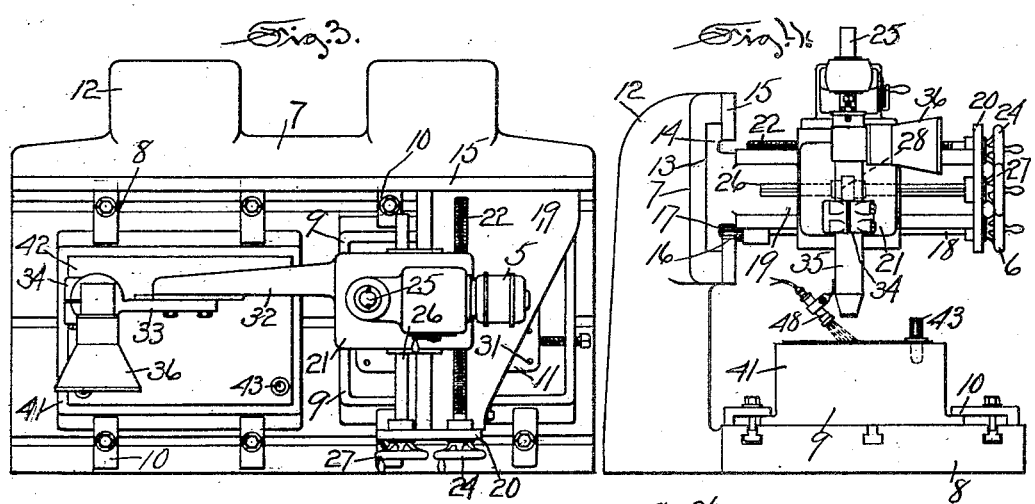
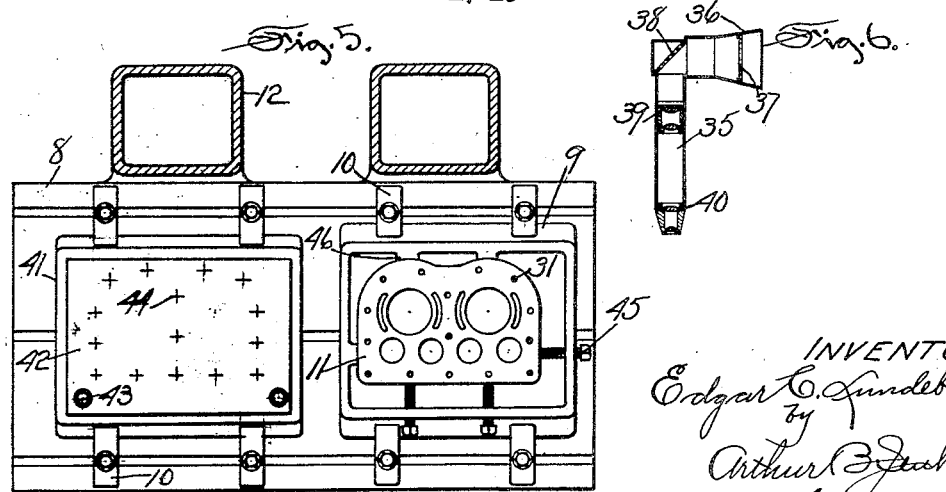
INVENTOR
Edgar C. Lundeberg.
by
Arthur B. Jenkins
ATTORNEY Patented Dec. 30, 1941

2,268,293

UNITED STATES PATENT OFFICE 2,268,293

BORING MACHINE

Edgar C. Lundeberg, Hartford, Conn.

Application March 29, 1939, Serial No. 264,789

4 Claims. (Cl. 77—64)

My invention relates to the class of machines for boring holes in metal or other material, and an object of my invention, among others, is the production of a machine of this type by the use of which holes may be accurately made in predetermined places in pieces of work in a rapid and efficient manner.

One form of a machine embodying my invention and in the construction and use of which the objects herein set out, as well as others, may be attained, is illustrated in the accompanying drawing in which—

Figure 1 is a view in front elevation of my improved boring machine with the work vise cut in section.

Figure 2 is an end view.

Figure 3 is a top plan view.

Figure 4 is a view looking at the opposite end from that shown in Fig. 2.

Figure 5 is a view in section on a plane denoted by the dotted line 5—5 of Fig. 1.

Figure 6 is a view in vertical section through the sighting tube.

In the accompanying drawing the numeral 8 denotes the base of my improved boring machine that may be of any suitable construction common to machines of this type. A work vise 9 is secured to said base as by means of clamps 10 in a manner common to structures of this type, a work piece 11 being shown as secured in the vise as an aid to the description.

A cross bar 7 connecting columns 12 rising from the base is formed with a slideway 13 for a boring head supporting slide 14 held in the slideway by gibs 15, the lower one of which is provided with rack teeth 16 meshing with the teeth of a pinion 17 secured to a shaft 18 rotatably mounted in bearings one projecting from the lower edge of a boring head supporting arm 19 and the other mounted in a plate 20 fastened to the outer end of the arm 19, as shown in Figs., 2, 3 and 4. The shaft 18 has a hand wheel 6 secured to its outer end by means of which the shaft 18 is turned to move the slide 14 along the slideway 13 in a manner that will be readily seen.

A boring head 21 is slidably supported by the arm 19 the upper and lower edges of which are formed as guides to direct the sliding movement of the head in a manner that will be readily understood, such sliding movement being obtained by means of a screw 22 in screw threaded engagement with a nut 23 secured to the head (see Fig. 2), said screw having a hand wheel 24 secured to its outer end as a means for turning it.

A boring spindle 25 is mounted in any suitable manner in the head and is suitably connected with a motor 5 supported by the head, all in any suitable manner and as will be readily understood by those skilled in the art and for which reason a more complete description is omitted herein, except to say that a tool feed shaft 26 having a hand feed wheel 27 secured thereto as a means for turning it, is splined to a boring tool feed pinion 28 (see Figs. 4) engaged with a rack 29 on the boring tool quill by means of which the boring tool 30 is fed in a well known manner.

The mechanism thus far described provides means for moving the boring tool forward and back and laterally and for feeding it to bore holes 31 in the work piece 11 herein schown as an engine casting, and in order to accurately determine the position of the boring head to accurately place said holes I provide a sighting device secured at the end of a sight supporting arm 32 as in a sight supporting bracket 33 which may be secured to the arm for horizontal adjustment thereon and which is split at its outer end to provide a sight clamp 34 for vertical adjustment of a sight tube 35 which is clamped in place as by means of screw bolts (see Figs. 1 and 4).

This sighting device in addition to the tube 35 includes a sight hood 36 having a transparent plate 37 near its front end and an opening to a down sight plate 38 obliquely disposed at an angle of forty-five degrees to the axis of the hood 36. The sight plate 37 is frosted or otherwise prepared to receive thereon the picture of an image displayed by reflection from a pattern now to be described. The plate in fact constitutes a screen for the display of said picture. Lenses 39 and 40 of any suitable character may be employed if desired at suitable places in the tube 35 to magnify the image or picture as reflected on the screen 37. A table 41 for a templet or pattern 42 is secured to the base 8 by clamps 10 as in the case of the work vise. The pattern may be secured to the table by screws 43 extending through holes made in the templet in suitable places to secure it in the right position, this templet or pattern being a temporary thing.

To use the machine the vise 9 with the work piece 11 secured therein is clamped in position to properly locate said piece and the templet 42 is secured in correct position, these positions being determined in any suitable manner as by trial. The templet has images in the form of indexes 44 for use in positioning the boring tool 30 to bore holes in proper places, such indexes as shown herein being in the form of crosses, the points where the lines cross denoting the center of the hole. It will be understood, however, that any other form of an index may be employed. For the sake of clearness these image indexes are omitted from Fig. 3.

The first work piece of a number to be bored having been positioned, screws 45 and studs 46 will serve to position the succeeding pieces. A work piece having been placed and secured, the operator looking at the plate 37 in the sight hood, by operation of the hand wheels 6 and 24, moves the boring tool and the sighting tube rigid therewith forward or back or laterally in either direction until an image index 44 in the form of a cross appears as a picture upon the screen or plate 37, the operation being continued until the picture of the image is moved across the screen into registry with a similar index 47 in the center of the screen 37. This will ensure that the boring tool is in position to bore a hole in the right place in the work piece and such hole may now be bored by operating the hand wheel 27 to effect the boring operation. All of the holes may be bored in the work piece by locating the sighting tube, and hence the boring tool, relatively to all the indexes in the manner just described.

By the use of my improved machine the work, which may involve heavy pieces, is held stationary and the comparatively light boring head is moved. This is a decided advantage in securing accuracy and speed with the expense of little effort and furthermore wear does not affect the accuracy of measurement.

The boring head is mounted to slide in two right-angular directions, this proving a most efficient way of making precision measurements by utilizing a system of rectilinear co-ordinates corresponding to the two directions the boring head travels.

By means of the templet not only are work pieces produced duplicates of one another, but component parts of such work pieces may be bored in exact conformity with the main piece. Should it be desired to have additional holes in one of the components, all that is necessary is to have an auxiliary templet which may be placed over and positioned on the main templet.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim:

1. A boring machine including a work holder, a pattern holder, a boring tool supporting member movable in different directions relatively to the work holder, a sighting device support connected with the boring tool support for equal movement therewith, a sighting device attached to said sighting device support and comprising a sighting tube opening downwardly on to the pattern holder, a sighting hood supported on the upper end of said tube and including a front sight plate arranged in a substantially vertical position, and a down sight plate back of the front sight plate to direct view downwardly on to said pattern.

2. A boring machine including a work holder, a pattern holder, a boring tool supporting member movable in different directions relatively to the work holder, a sighting device support attached to said boring tool support for equal movement therewith, a sighting device attached to said sighting device support and comprising a sighting tube opening downwardly on to said pattern holder, a sighting hood supported on the upper end of said tube and including a front sight plate arranged in a substantially vertical position and a down sight plate back of the front sight plate to direct view downwardly on to said pattern.

3. A boring machine including a work holder, a pattern holder, a boring tool supporting member movable in different directions relatively to the work holder, a sighting device support connected with the boring tool support for equal movement therewith, a sighting device comprising a sighting tube attached to the sighting device support and opening downwardly on to said pattern holder, a sighting hood supported at one end on the upper end of said tube and opening forwardly therefrom, a front sight plate arranged in a substantially vertical position in the front part of said hood and a down sight plate located at the back of said hood to direct view downwardly on to said pattern.

4. A boring machine including a work holder, a pattern holder located at one side of and spaced from the work holder, a boring tool supporting member comprising a cross bar slidably horizontally mounted, a boring drill support mounted on said cross bar, a sighting device support secured to said cross bar for equal movement therewith, a sighting device comprising a sighting tube attached to the sighting device support and opening downwardly on to said pattern holder, a sighting hood supported on the upper end of said tube and including a front sight plate arranged in a substantially vertical position and a down sight plate back of the front plate to direct view downwardly on to said pattern.

EDGAR C. LUNDEBERG.